United States Patent [19]
von Ende

[11] Patent Number: 5,669,489
[45] Date of Patent: Sep. 23, 1997

[54] CODING DEVICE

[75] Inventor: Hermann von Ende, Nürnberg, Germany

[73] Assignee: Fritz Hartmann Gerätebau GmbH & Co. KG, Baiersdorf, Germany

[21] Appl. No.: 687,768

[22] Filed: Jul. 26, 1996

Related U.S. Application Data

[63] Continuation of Ser. No. 230,244, Apr. 20, 1994, abandoned.

[30] Foreign Application Priority Data

Apr. 20, 1993 [DE] Germany ................... 9305865 U

[51] Int. Cl.⁶ .................................................. H01H 19/20
[52] U.S. Cl. .................. 200/570; 200/564; 200/565; 200/566; 200/11 R; 200/14
[58] Field of Search ................................ 200/564, 565, 200/566, 567, 568, 570, 571, 572, 526, 527, 529, 302.1, 11 R, 14, 11 A, 11 D, 11 G, 11 J, 11 K, 316, 336

[56] References Cited

U.S. PATENT DOCUMENTS

| | | | |
|---|---|---|---|
| 3,184,557 | 5/1965 | Clarey | 200/566 |
| 3,196,237 | 7/1965 | Westgate, Jr. | 200/565 |
| 3,584,163 | 6/1971 | White | 200/565 |
| 4,131,771 | 12/1978 | Erickson et al. | |
| 4,146,758 | 3/1979 | Hiwatahi et al. | 200/14 |
| 4,176,265 | 11/1979 | Mobus et al. | 200/316 |
| 4,379,955 | 4/1983 | Comerford | 200/565 |
| 4,788,393 | 11/1988 | Muramatsu et al. | 206/570 |

FOREIGN PATENT DOCUMENTS

| | | |
|---|---|---|
| 20 20 376 | 11/1971 | Germany. |
| 37 02 346 | 7/1987 | Germany. |
| 30 40 545 | 5/1992 | Germany. |
| 56-138834 | 10/1981 | Japan. |
| 59-71218 | 4/1984 | Japan. |
| 1-177840 | 12/1989 | Japan. |
| 2-6213 | 1/1990 | Japan. |

*Primary Examiner*—David J. Walczak
*Attorney, Agent, or Firm*—Spencer & Frank

[57] ABSTRACT

A coding device includes a contact carrier (3) and a coding disk (4) that can be set in a plurality of rotary positions relative to the contact carrier (3) to set corresponding codes. Moreover, the coding disk (4) is displaceable between an inactive position, in which it is spaced apart from the contact carrier (3) and no code is effective, and an active position, in which a code corresponding to the rotary position of the coding disk (4) is set on the contact carrier (3). Because a desired code can be selected by rotating the coding disk (4) to the corresponding rotary position while the coding disk is in its inactive position, the code selection can be effected in a potential-free manner.

27 Claims, 3 Drawing Sheets

CODING DEVICE

CROSS REFERENCE TO RELATED APPLICATION

This application is a continuation of application Ser. No. 08/230,244, filed Apr. 20, 1994, now abandoned.

BACKGROUND OF THE INVENTION

The invention relates to a coding device, and particularly to a coding switch of the momentary-contact type or the maintained-contact type that can be activated by key pressure.

The basic nature of coding switches and their mode of operation are known, for example, from German Patent DE 3,136,045.C2. The essential component of a coding switch of this type is a coding disk and a dial with which up to sixteen different codes can be set, depending on the rotary position of the dial. A number of other codings are also possible. In practice, ten and sixteen coding options are standard.

A multipath rotary switch having a push-button key and used particularly for motor-operated household appliances is known from German Utility Model 1,736,669. The push-button key is centrally disposed in the handle of the rotary switch and, via a plunger or the like, acts upon a contact lever that cooperates with an opposite contact. The operation of the push-button key is only possible in one position of the rotary switch, namely in its off-position. Among the disadvantages of this arrangement is that only one fixed, predetermined circuit can be activated by means of the push-button key. Moreover, the rotary switch is switched over into different on-positions in a disadvantageous manner, while the corresponding coding disk is connected with the operating voltage. This leads to overly high voltage stress of the coding disk and the entire apparatus during switching.

German Patent Application DE 2,705,091.A1 discloses a rotary switch with push-button operation for televisions. In this case a two-sided contact rotor can be switched back and forth between two active positions in order to increase the number of possible settings. This rotary switch does not permit a potential-free switchover between different code settings, meaning that a voltage stress and particularly spikes occur which stress the coding disk and the entire apparatus and shorten their service life. This rotary switch does not include a momentary-contact feature.

SUMMARY OF THE INVENTION

It is the object of the present invention to further develop a generic coding device in such a manner that it permits potential-free setting of different codes.

This object can be attained with a coding device which includes a contact carrier and a coding disk that is mounted so that it can not only be rotated to a plurality of rotary positions relative to the contact carrier to set corresponding codes, but so that it can also be moved relative to the contact carrier between an active position and an inactive position. In its inactive position the coding disk is spaced apart from the contact carrier, and in its active position, the coding disk engages the contact carrier and sets a code corresponding to a rotary position to which the coding disk was rotated while in the inactive position.

The coding device of the invention, which can be a momentary-contact switch or a maintained-contact switch, is distinguished in that it can be set potential-free to the respective code and is only activated, that is, the coding disk and contact carrier are only brought into contact to produce an electrical signal, by means of key pressure after coding is completed, for example.

As was noted above, the coding device includes a contact carrier and a coding disk that can be rotated relative to the contact carrier to set appropriate codes. Moreover, the coding disk can be displaced between an inactive position, in which it is at a distance from the contact carrier and no code is effective, and an active position, in which a code corresponding to the rotary position of the coding disk is set on the contact carrier by means of the coding disk. Because the coding disk can be set into different rotary positions in the inactive position, the code selection can take place in a potential-free manner.

Voltage stresses during the displacement or switchover of the coding disk do not occur in its inactive position, which prolongs the service life of the entire apparatus controlled via the coding device. In particular, the contacts in the coding device, which are typically a weak point in an electrical circuit, are not excessively stressed, which improves the functioning reliability and durability of the coding device.

The coding device of the invention also basically permits each individual selectable code to be temporarily defined by a push-button operation when the coding device is configured as a momentary-contact coding switch. Thus, there is not only one fixed, predetermined circuit that can be activated with the switch; rather, the circuits that are to be activated via the switch can be preselected by setting the respective codes, that is, by rotating the coding disk. Because of this, an advantage is attained in that the coding device of the invention opens up a broad field of applications, and for the first time selectable control procedures are possible by means of momentary-contact switches.

In an advantageous manner, the coding disk can be mounted on a rotary shaft. The coding disk is connected coaxially with the rotary shaft for rotary displacement, and the coding disk is also movable between the inactive position and the active position by means of the rotary shaft. It is also advantageous for the free end of the rotary shaft to be provided with a knurl, or to be configured there as a polyhedral shaft. Hence, the rotary shaft can be easily gripped with the fingers, or a knob or a crank can be attached.

In an advantageous manner, the coding disk can be indexed by latching it into the predetermined rotary positions which correspond to the codes. This permits a defined and reliable setting of codes. The mechanism for indexing the coding disk includes a ring of teeth that is associated with the coding disk and cooperates with at least one stop spring to latch the coding disk in at least one of the rotary positions. Two stop springs are preferably provided and they are preferably configured as leaf springs. Furthermore, the leaf springs preferably have rounded, partially-spherical latch cams which cooperate with the ring of teeth. This configuration is particularly simple to produce and is easily switchable. Furthermore, in the above-described coding devices, the ring of teeth can be provided on the rotary shaft, which simplifies production and operation. Rotating the coding disk and hence setting a desired code can be executed particularly simply when the coding disk is prestressed or biased towards its inactive position. This can be achieved, for example, by means of a compression spring, and preferably by means of a helical compression spring.

In order for the space between the coding disk and the contact carrier to be free, so that providing a compression spring between the coding disk and the contact carrier in the region of the contacts themselves need not be considered, it is advantageous for one end of the compression spring to press against the end of a blind bore in the rotary shaft and for the other end of the compression spring to press against a guide pin that extends into the blind bore and is stationary relative to the contact carrier. It is preferable for the guide pin to have a piston-like upper end that is longitudinally displaceable inside the blind bore and to have a lower plunger that passes coaxially through the coding disk and that is supported against the contact carrier.

Additionally or as an alternative, the coding disk can be biased into its inactive position by the stop spring. By means of this, either the effect of the compression spring can be increased, which results in better prestressing or makes only a weaker compression spring necessary, also improving overall durability, or the compression spring may be omitted. The stop spring advantageously assures both the biasing of the coding disk into the inactive position and reliable latching engagement in the selectable code positions. For example, the prestressing effect of the stop spring can be achieved by providing the rotary shaft with a protrusion which is preferably configured as a conical annular surface and which cooperates with the stop spring or stop springs to urge the coding disk towards its inactive position. A protrusion of this type can be integral with the rotary shaft, which permits advantageous production and simple operation.

If a mechanism is provided for latching or otherwise maintaining the coding disk in its active position, a maintained-contact coding switch that can be switched potential-free is created by the coding device of the invention. The coding disk is not displaced or pressed out of its inactive position into its active position until the desired code is set, so that the set code becomes effective by means of the contact of the coding disk with the contact carrier. Without the option of latching the coding disk into its active position, the coding device of the invention represents a momentary-contact coding switch in which the selected code is only effective as long as the coding disk is displaced while in contact with the contact carrier, which is possible by means of compression, for example.

If the coding device includes a housing, a seal, preferably in the form of a sealing ring, may be provided to seal the housing against the rotary shaft. The seal should be effective between a radially projecting shoulder of the rotary shaft and a front housing face flanking a housing passage or recess through which the outer end of the rotary shaft extends. The advantage attained by this is that, on the one hand, the coding device is sealed outwardly, so that moisture that would impair the functioning reliability and durability of the coding device cannot enter, even if the coding device were used in an environment with a high level of humidity or splashing liquid, and that, on the other hand, the rotary shaft is guided while dry, which improves shaft displacement in general.

The ends of the leaf springs may extend into housing recesses inside the housing in order to secure the leaf springs to the housing. Because of this, the leaf springs can be particularly simply and reliably mounted.

The coding disk may have a contact surface that faces the contact carrier and that has at least one contact path and insulating surface regions. When the coding disk is displaced from its inactive position to its active position, the at least one contact path of the coding disk engages the contacts of the contact carrier that correspond to the code. Different codes are thereby generated and can be set particularly simply. To produce the most reliable, electrically conductive connections possible between the contact carrier and the coding disk during displacement, it is advantageous for the contact carrier to be at least partly flexible and/or for its contacts to be at least partly flexible or resilient.

Moreover, display devices can be provided, for example in the form of one or more light emitting diodes, to signal the active position of the coding disk, for example. This offers the advantage that an operator is notified in a clear and easily identifiable manner of the operating state of the coding device. A corresponding display can also be provided in addition to or as an alternative to the above-described embodiment for the inactive position, and even for one, a plurality, or all of the codes associated with the corresponding rotary positions of the coding disk.

BRIEF DESCRIPTION OF THE DRAWINGS

The Figures show only one embodiment of the invention.

DESCRIPTION OF THE PREFERRED EMBODIMENTS

Figure 1:
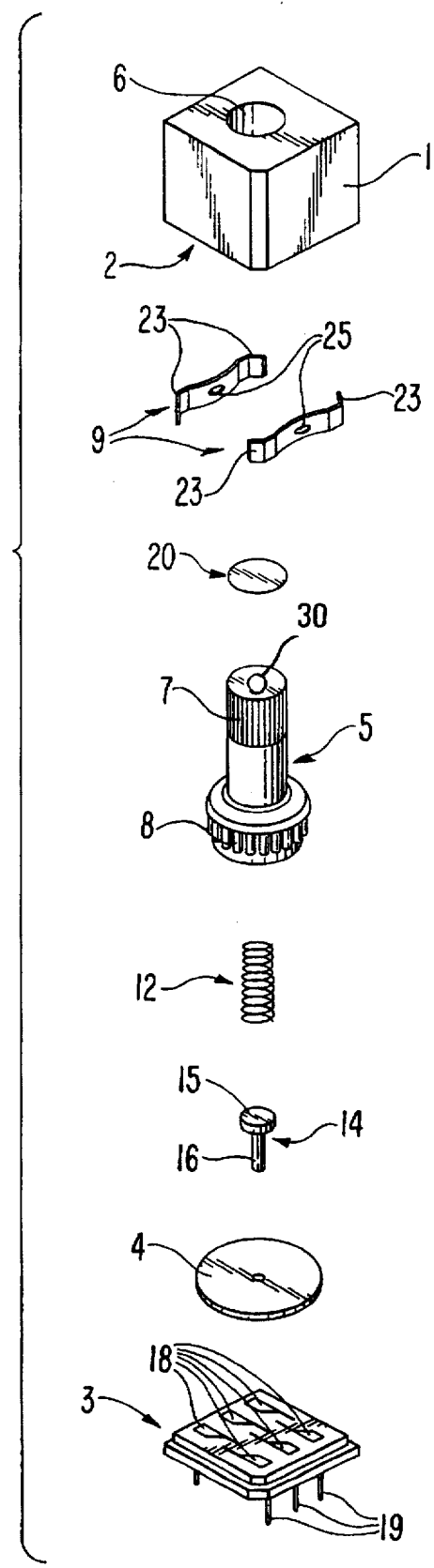
FIG. 1 is an exploded perspective view illustrating the essential components of a momentary-contact coding switch as an example of a coding device in accordance with the present invention.

The same parts are provided with the same reference numerals in the drawings and the related description. For the sake of clarity, not all parts visible in each drawing are indicated with reference numerals. A corresponding allocation of numerals is readily apparent to a person skilled in the art when viewing the drawing.

A coding switch in accordance with the present invention essentially comprises a housing 1 and a contact carrier 3 securely inserted into a housing opening 2, which is shown at the bottom in FIG. 1, and a rotatably seated coding disk 4. The coding disk 4 is securely attached to the lower end of a rotary shaft 5, which is configured as an indexing shaft as will be discussed in more detail below. Coding disk 4 has a downwardly-facing contact surface (insulating surface region 29 with contact paths 27 in FIG. 3). The indexing shaft 5 is rotatably seated in a housing passage or recess 6 opposite housing opening 2. The end of indexing shaft 5 that projects from housing 1 is provided with a knurl 7 to increase its grip. Instead of providing knurl 7, indexing shaft 5 can also be configured as a polyhedral shaft 7' as shown in FIG. 4a, for example for attaching a knob or other operating element.

Indexing shaft 5 is provided at its circumference located inside housing 1 with a ring of teeth 8 as part of a detent latch, particularly a spring detent latch. Ring of teeth 8 cooperates with at least one leaf spring 9 that is secured so as to project from an inside housing wall 10 in the direction of ring of teeth 8, and that extends into the latter.

Figures 2, 3, 4:
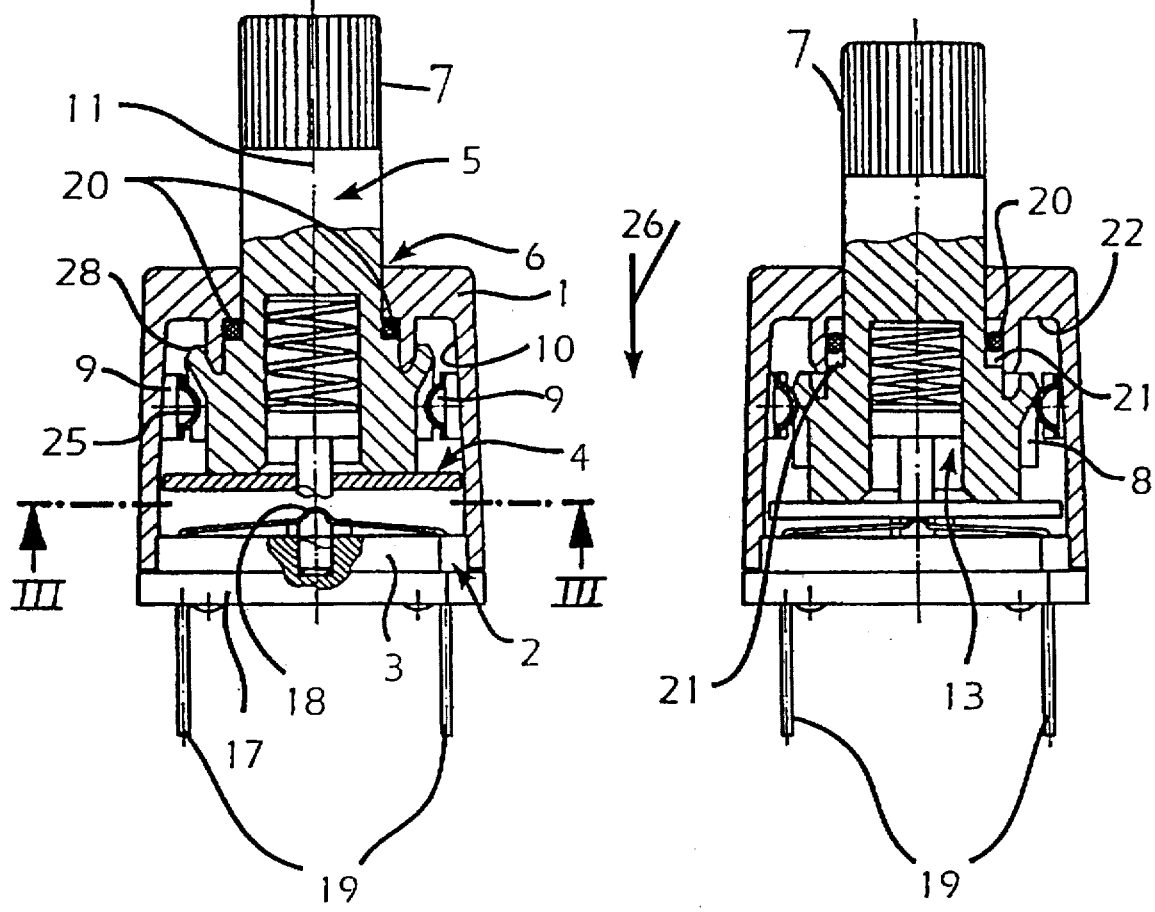
FIG. 2 is a vertical sectional view taken along the longitudinal axis of the switch, and shows the switch with its coding disk in the inactive position.
FIG. 3 is a sectional view taken along line III—III in FIG. 2, and shows a plan view of a coding disk, with a representation of contact paths (shown darkened) and insulating surface regions (shown light) between the contact paths.
FIG. 4 is a vertical sectional view analogous to FIG. 2 but shows the switch with its coding disk in the active position.
Figure 4A:
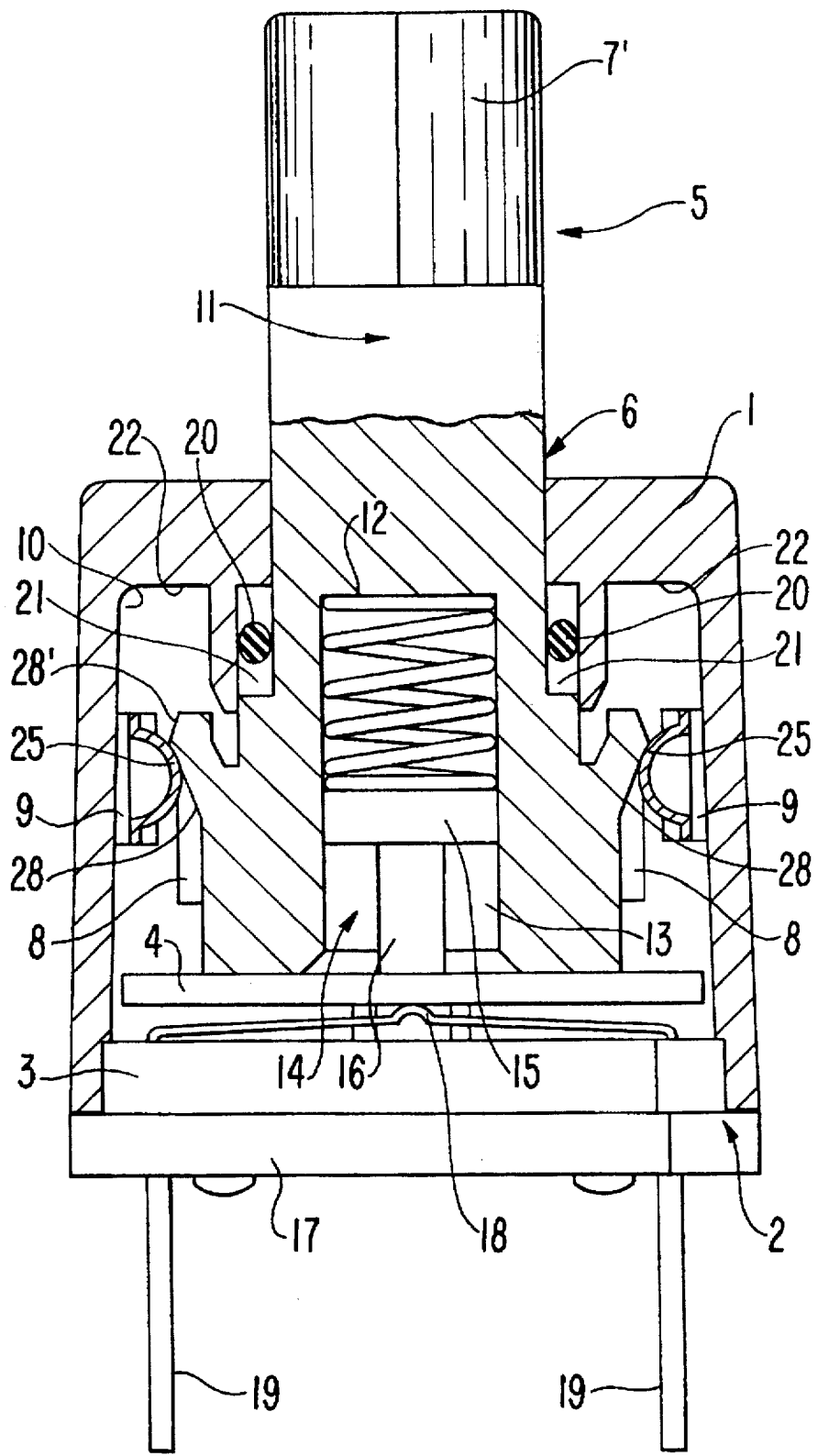
FIG. 4a is an enlarged representation of FIG. 4.

As can be seen in FIGS. 2, 4 and 4a, indexing shaft 5 is seated in housing 1 to rotate with respect to the longitudinal axis 11 of the housing. Indexing shaft 5 is biased upward by an axially-acting compression spring 12, which normally keeps the coding disk 4 secured to the lower end of indexing shaft 5 out of contact with contact carrier 3, that is, in the inactive position of the disk. Compression spring 12 lies in a blind bore 13 at the lower end of indexing shaft 5 and can be compressed longitudinally within blind bore 13. The lower end of spring 12 is supported by a piston-like upper end 15 of a guide pin 14. Guide pin 14 also has a plunger 16 which is supported against contact carrier 3 or an outside closure plate 17 fixedly secured thereto. Contacts 18 are disposed on the top side of the contact carrier 3, which is generally plate-shaped, and have terminal ends 19 which extend through openings in closure plate 17 to the outside of the coding switch.

A sealing ring such as an O-ring 20 is attached to indexing shaft 5, at the inside end of housing recess 6, as is shown in FIGS. 2, 4 and 4a. The ring is effective between a radially projecting front housing face 22, which forms the upper closure of housing 1 in FIGS. 2, 4 and 4a, and a radially projecting shoulder 21 on indexing shaft 5.

To set the desired code, when coding disk 4 is in its inactive position, as shown in FIG. 2, indexing shaft 5 is rotated into the desired selection position. Leaf springs 9 serve as stop springs, and each of the springs engages a tooth gap of ring of teeth 8 to hold the indexing shaft 5 in the selection position. Each leaf spring 9 has two spring ends 23 which are disposed in housing recesses 24 integral to the housing 1 at its inner corners, as shown in FIG. 3, to secure the respective leaf spring against displacement in the axial or setting axis direction. The leaf springs 9 are of such a length that they are braced between two opposite housing sides.

Each leaf spring 9 is provided between the two spring ends 23 with a latch cam 25 that protrudes in the direction toward indexing shaft 5 and engages the tooth gaps of ring of teeth 8.

In the embodiment shown, two leaf springs 9 are provided on two diametrically opposite housing sides and synchronously engage tooth gaps of ring of teeth 8 or glide over teeth. Latch cams 25 have a rounded, partially-spherical surface shape and are partly responsible for a displacement effect, which will be described below, whereby the indexing shaft 5 automatically returns to its potential-free selection position after it has been depressed.

The rotation of indexing latch shaft 5 is effected potential-free in the inactive position of coding disk 4, shown in FIG. 2. To activate the coding switch, its indexing shaft 5 is pressed downwardly in pressing direction 26. Pressing indexing shaft 5 downward moves coding disk 4 from its inactive position into the active, or switching, position seen in FIGS. 4 and 4a. In this switching position, the contact paths 27 of coding disk 4 engage the contacts 18 of the plate-shaped contact carrier 3 that correspond to the code.

To augment the automatic backward movement of coding disk 4 into the potential-free initial, or inactive, position shown in FIG. 2, indexing shaft 5 is provided with an annular protruding portion 28 above its ring of teeth 8, at a location where it can be engaged by latch cams 25. The lower side of protruding portion 28 has a surface that slopes downward in a conical manner. A return pressure is exerted on indexing shaft 5, counter to pressing direction 26, when latch cams 25 press against this sloping surface.

The illustrated embodiment is of a momentary-contact push-button coding switch that only remains in the contact position while key pressure is exerted on indexing shaft 5 in pressing direction 26. If the pressure in pressing direction 26 is released, compression spring 12, with the aid of leaf springs 9, presses indexing shaft 5 out of its active switching position (FIGS. 4, 4a) back into the potential-free, inactive initial position (FIG. 2). However, in a modification one can provide for the indexing shaft 5 to remain in its compressed position when the pressure in pressing direction 26 is released, for example, by an engagement of latch cams 25 with the inwardly protruding portion 28' when shaft 5 is pushed further in direction 26. Then the subject of the invention would no longer be considered a momentary-contact coding switch, but a maintained-contact coding switch.

In another modification one can use an additional pair of terminals 19 for supplying power to a light-emitting diode 30 (shown schematically in FIG. 1) or the like located in the handle part of indexing shaft 5 and in order to signal the functioning position of the coding switch, for example its active position.

It will be understood that the above description of the present invention is susceptible to various modifications, changes, and adaptations, and the same are intended to be comprehended within the meaning and range of equivalents of the appended claims.

What I claim is:

1. A coding device, comprising:
    a contact carrier;
    a coding disk which cooperates with the contact carrier to set codes;
    mounting means for mounting the coding disk for rotary movement with respect to the contact carrier, the coding disk being rotatable through a plurality of rotary positions which correspond to the codes, and for mounting the coding disk for linear movement between an inactive position, wherein the coding disk is spaced apart from the contact carrier, and an active position, where the coding disk engages the contact carrier to set a code corresponding to a rotary position to which the coding disk was rotated while in the inactive position, said mounting means comprising a rotatable shaft to which the coding disk is coaxially connected; and
    indexing means for latching the coding disk in at least one of the rotary positions, said indexing means comprising a ring of teeth, and at least two stop springs configured as leaf springs, said stop springs cooperating with said ring of teeth.

2. The coding device of claim 1, wherein the shaft has a free end which is provided with a knurl.

3. The coding device of claim 1, wherein the shaft has a free end with a polyhedral configuration.

4. The coding device of claim 1, further comprising biasing means for biasing the coding disk toward its inactive position.

5. The coding device of claim 4, wherein the biasing means comprises a compression spring.

6. The coding device of claim 1, further comprising means for maintaining the coding disk in its active position.

7. The coding device of claim 1, wherein the contact carrier has a plurality of contacts and the coding disk has a contact surface which faces the contacts, the contact surface of the coding disk having at least one insulating region and at least one contact path which engages contacts of the contact carrier when the coding disk is in its active position.

8. The coding device of claim 7, wherein the contacts are at least partially resilient.

9. The coding device of claim 1, wherein the contact carrier is at least partially resilient.

10. The coding device of claim 1, further comprising a light emitting member to visibly signal whether the coding disk is in its active or inactive position.

11. The coding device of claim 1, wherein the ring of teeth is connected to the shaft.

12. A coding device, comprising:
   a contact carrier;
   a coding disk which cooperates with the contact carrier to set codes;
   mounting means for mounting the coding disk for rotary movement with respect to the contact carrier, the coding disk being rotatable through a plurality of rotary positions which correspond to the codes, and for mounting the coding disk for linear movement between an inactive position, wherein the coding disk is spaced apart from the contact carrier, and an active position, where the coding disk engages the contact carrier to set a code corresponding to a rotary position to which the coding disk was rotated while in the inactive position, said mounting means comprising a rotatable shaft to which the coding disk is coaxially connected, the shaft having a blind bore and the coding disk having a hole which communicates with the blind bore;
   a guide pin which extends into the blind bore through the hole in the coding disk, the guide pin being stationary with respect to the contact carrier; and
   a compression spring in the blind bore to bias the coding disk toward its inactive position.

13. The coding device of claim 12, further comprising indexing means for latching the coding disk in at least one of the rotary positions.

14. The coding device of claim 13, wherein the indexing means comprises a ring of teeth, and a stop spring which cooperates with the ring of teeth.

15. The coding device of claim 14, wherein the stop spring is configured as a leaf spring and has a latch cam to engage the ring of teeth, the latch cam having a rounded, partially spherical shape.

16. The coding device of claim 14, wherein the ring of teeth is connected to the shaft.

17. The coding device of claim 12, wherein the guide pin has an enlarged upper end which is disposed in the blind bore and which supports an end of the compression spring, and an elongated plunger which passes through the hole in the coding disk and which is supported by the contact carrier.

18. The coding device of claim 12, wherein the shaft has a free end which is provided with a knurl.

19. The coding device of claim 12, wherein the shaft has a free end with a polyhedral configuration.

20. The coding device of claim 12, wherein the contact carrier is at least partially resilient.

21. A coding device, comprising:
   a contact carrier;
   a coding disk which cooperates with the contact carrier to set codes;
   mounting means for mounting the coding disk for rotary movement with respect to the contact carrier, the coding disk being rotatable through a plurality of rotary positions which correspond to the codes, and for mounting the coding disk for linear movement between an inactive position, where the coding disk is spaced apart from the contact carrier, and an active position, where the coding disk engages the contact carrier to set a code corresponding to a rotary position to which the coding disk was rotated while in the inactive position, said mounting means comprising a rotatable shaft to which the coding disk is coaxially connected;
   indexing means for latching the coding disk in at least one of the rotary positions, said indexing means comprising a ring of teeth on the rotatable shaft, and a leaf spring which cooperates with the ring of teeth; and
   first and second biasing means for biasing the coding disk toward its inactive position, the first biasing means comprising a compression spring which urges the shaft away from the contact carrier, the second biasing means being engaged by the leaf spring when the coding disk is in its active position.

22. The coding device of claim 21, wherein the second biasing means comprises an annular protruding portion on the shaft, the annular protruding portion having an inwardly tapered surface which is engaged by the leaf spring.

23. A coding device, comprising:
   a hollow housing having: an end with a housing opening and another end with a housing passage; a housing wall having inner corners and housing recesses at the inner corners; and an inner housing surface around the housing passage;
   a contact carrier;
   a coding disk disposed inside the housing, and cooperating with the contact carrier to set codes;
   mounting means for mounting the coding disk for rotary movement with respect to the contact carrier, the coding disk being rotatable through a plurality of rotary positions which correspond to the codes, and for mounting the coding disk for linear movement between an inactive position, wherein the coding disk is spaced apart from the contact carrier, and an active position, where the coding disk engages the contact carrier to set a code corresponding to a rotary position to which the coding disk was rotated while in the inactive position, said mounting means comprising a rotatable shaft to which the coding disk is coaxially connected, said rotatable shaft extending through the housing passage and including a radially projecting shoulder;
   sealing means for providing a seal between the housing and the shaft, and comprising a sealing ring around the shaft and between the shoulder and the inner housing surface; and
   indexing means for latching the coding disk in at least one of the rotary positions, said indexing means including a ring of teeth on the shaft, and a stop spring which cooperates with the ring of teeth, said stop spring being configured as a leaf spring which is secured to the housing wall and having a portion projecting toward the ring of teeth, said leaf spring further having ends extending into the housing recesses.

24. The coding device of claim 23, wherein the contact carrier comprises contacts with terminals connected thereto, and further comprising an outlet closure plate to which the contact carrier is attached, the outlet closure plate closing the housing opening and having at least one passage through which the terminals extend.

25. The coding device of claim 23, further comprising biasing means for biasing the coding disk toward its inactive position.

26. The coding device of claim 25, wherein the biasing means comprises a compression spring.

27. A coding device, comprising:
   a contact carrier;
   a coding disk which cooperates with the contact carrier to set codes;

mounting means for mounting the coding disk for rotary movement with respect to the contact carrier, the coding disk being rotatable through a plurality of rotary positions which correspond to the codes, and for mounting the coding disk for linear movement between an inactive position, wherein the coding disk is spaced apart from the contact carrier, and an active position, where the coding disk engages the contact carrier to set a code corresponding to a rotary position to which the coding disk was rotated while in the inactive position, said mounting means comprising a rotatable shaft to which the coding disk is connected;

indexing means for latching the coding disk in at least one of the rotary positions, said indexing means comprising a ring of teeth on the rotatable shaft, and a leaf spring which engages the ring of teeth when the coding disk is in its inactive position; and means for urging the coding disk towards its inactive position, said means for urging comprising an annular protruding portion on the shaft, the annular protruding portion having an inwardly tapered surface which is engaged by the leaf spring when the coding disk is in its active position.

* * * * *